United States Patent
Maria Van Giezen et al.

(10) Patent No.: US 6,688,803 B2
(45) Date of Patent: Feb. 10, 2004

(54) CONNECTION ASSEMBLY

(75) Inventors: Maurice Gerardus Maria Van Giezen, Vogelenzang (NL); Paul Martens, Voorhout (NL)

(73) Assignee: Royal Packaging Industries Van Leer N.V., Amstelveen (NL)

(*) Notice: Subject to any disclaimer, the term of this patent is extended or adjusted under 35 U.S.C. 154(b) by 0 days.

(21) Appl. No.: 10/027,585

(22) Filed: Oct. 16, 2001

(65) Prior Publication Data

US 2002/0127053 A1 Sep. 12, 2002

Related U.S. Application Data

(62) Division of application No. 09/471,515, filed on Dec. 23, 1999, now abandoned.

(51) Int. Cl.[7] ................................................. F16B 17/00
(52) U.S. Cl. ........................ 403/347; 403/346; 403/245; 403/291
(58) Field of Search ............................. 403/346, 347, 403/345, 234, 240, 241, 245, 291; 29/283.5, 455.1, 506, 510, 516, 514; 285/130.1, 188, 192

(56) References Cited

U.S. PATENT DOCUMENTS

| | | | |
|---|---|---|---|
| 548,998 A | | 10/1895 | Reinhard Mannesmann |
| 1,666,613 A | * | 4/1928 | Woods ........................ 403/346 |
| 3,497,245 A | * | 2/1970 | Metzger ..................... 403/346 |
| 4,073,561 A | * | 2/1978 | Baranowski ............ 339/112 R |
| 4,466,600 A | | 8/1984 | Tuttle |
| 4,631,797 A | | 12/1986 | Hill |
| 4,776,719 A | | 10/1988 | Kreider |
| 4,813,651 A | | 3/1989 | Rutledge |
| 5,001,795 A | | 3/1991 | Kasten |
| 5,678,865 A | | 10/1997 | Anderson |
| 5,882,139 A | | 3/1999 | Valin |
| 6,016,877 A | | 1/2000 | Noonan et al. |

FOREIGN PATENT DOCUMENTS

| | | |
|---|---|---|
| CH | 412476 | 11/1966 |
| DE | 23 44 351 C2 | 6/1985 |
| FR | 705424 | 3/1931 |
| GB | 2 106 948 | 4/1983 |
| GB | 2 133 430 | 7/1984 |
| GB | 2 303 653 | 2/1997 |
| WO | WO 91/02922 | 3/1991 |

* cited by examiner

Primary Examiner—Lynne H. Browne
Assistant Examiner—Ernesto Garcia
(74) Attorney, Agent, or Firm—Knobbe, Martens, Olson & Bear, LLP

(57) ABSTRACT

A connection assembly of first and second elements. The first element has a receiving opening through which the second element is passed and penetrates the first element. The first element is connected to the second element at one or more positions in the region of their intersection. At least one of the first and second elements have ridges arranged to lie adjacent the opposing elements. A plurality of the elongate elements can be interconnected in a plurality of connection assemblies to form a grid structure.

6 Claims, 5 Drawing Sheets

CONNECTION ASSEMBLY

RELATED APPLICATIONS

This application is a divisional application of U.S. application Ser. No. 09/471,515 filed Dec. 23, 1999, now abandoned entitled "A Connection Assembly".

FIELD OF THE INVENTION

The present invention relates to a connection assembly for connecting two elongate elements at an intersection. Such connections are useful in various commercial applications where one element such as a tube or a rod is to be connected at an angle with another tube. Commercial applications would include the production of grids, fences, cages. Applications are also foreseen in the furniture and aircraft industries as well as in the packaging and transportation of freight.

BACKGROUND OF THE INVENTION

The German Patent DE-C-33 44 351 discloses a grid arrangement wherein plate-like carrier rods are provided with oval holes therethrough. Cross-connector tubes are passed through the holes in perpendicular arrangement. After having passed through the holes, the tubes are mechanically deformed on either side of the hole to produce a connection at the intersection.

In many applications, it is desirable to have a lightweight construction but one of optimum mechanical strength. In such cases, it would be desirable to have a connection assembly at the point of intersection which can sustain high loads and which does not deteriorate under fatigue. Moreover, the volume taken up by the connection should be kept to a minimum to satisfy space requirements. The connection assembly, particularly when used to form a grid, should be simple and inexpensive to manufacture, but at the same time be reliable in terms of quality of the connection. Moreover, the connection assembly should be suitable for series production.

SUMMARY OF THE INVENTION

According to the present invention, a connection assembly is provided which satisfies the above criteria. The connection assembly comprises first and second elongate elements connected to one another at an intersection. The elements preferably are connected at right angles, although other angles are possible. The first elongate element has a receiving opening formed therein through which the second elongate element passes so as to penetrate through the first element. The first and second elements are then connected to one another at one or more positions within the region of their intersection. If the two elements are made of metal, the connection at the one or more positions may be performed by resistance welding. Alternatively, when the elements are made of plastic material, the connections can be made ultrasonic welding or induction welding. The connections can also be made by melt bonding or with an adhesive. As another alternative, the two elements may be appropriately deformed within the region of intersection so as to produce a form fit connection.

The inner diameter of the receiving hole of the first tube is preferably dimensioned with respect to the outer diameter of the second tube such that it passes therethrough by overcoming a slight frictional force. The second tube therefore has a non-positive (frictional) connection with the first tube when mounted. This arrangement provides for stability of the connection against bending forces which will arise at the intersection. Although this arrangement is preferred a frictional fit is not necessary for the present invention.

In another embodiment of the invention, the central axes of the two elements intersect one another and form a plane. The outer surfaces of the smaller diameter second element defines two tangential planes, which are both parallel to the plane defined by the centre axes of the two elements. The elements are connected to one another at two positions at these tangential planes, where the outer surface of the second element lies opposed to an inner surface of the first element.

In another preferred embodiment, the first element comprises a tubular structure and is provided with one or more ridges formed along its interior. The crests of these inner ridges will contact or lie close to the outer surface of the second element when penetrated through the receiving opening. The locations where the one or more ridges either contact or lie close to the outer surface provides the one or more contact positions.

The first and second elements used in constructing the present connection assembly can be of various shapes. For example, the first and second elongate elements can be provided in tubular form with a cross-section being substantially circular, oval, square, triangular or rectangular. In a further embodiment, the first element can be provided as an open profile, such as a U-shaped or a C-shaped profile with the receiving opening provided in the side legs of the profile. It is also possible that the second elongate element be provided in the form of a plate which passes through a corresponding slot in the first element as the receiving opening.

The connection assembly of the present invention provides good mechanical strength and reliability of the connection, while at the same time allowing a simple and inexpensive manufacturing process. In the case that the second element penetrates the first element in a frictional fit, additional stability against bending moments arising within the plane of the two elements is provided. The one or more positions at which the elements are then connected enhances the strength against deformation out of the plane of the two elements.

BRIEF DESCRIPTION OF THE DRAWINGS

Further objects and advantages of the invention will become apparent in the following description of embodiments in conjunction with the drawings.

DETAILED DESCRIPTION OF THE INVENTION

Figure 1:
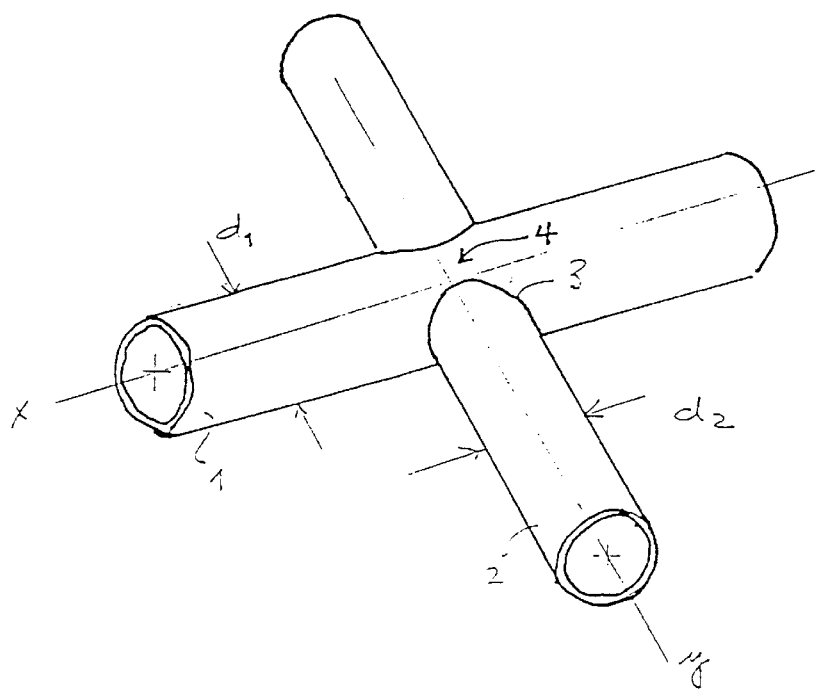
FIG. 1 shows a perspective view of an embodiment of the intersection of two tubular elements.

Referring to FIG. 1, first and second elongate elements 1, 2 are placed to intersect one another by penetration of the second element 2 through an opening 3 in the first element 1. In many applications, the receiving opening 3 will be formed such that a right-angle intersection results, although this orientation is not necessary. The receiving opening 3 can be formed such that the centre axis x of the first element intersects with the centre axis y of the second element 2. Again, this arrangement is preferred, however, the centre axes x, y of the two elements may be off-set if desired for certain applications.

The first and second elements 1, 2 shown in the embodiment of FIG. 1 are tubular members having a circular cross-section. Naturally, the diameter d2 of the second tube is smaller than the diameter d1 of the first tube. Preferably the outer diameter d2 of the second element is 20% to 30% smaller than the outer diameter d1 of the first element 1. As an example, the diameter of the first tube 1 could be 22 mm with the diameter of the second tube 2 being 16 mm.

Figure 2:
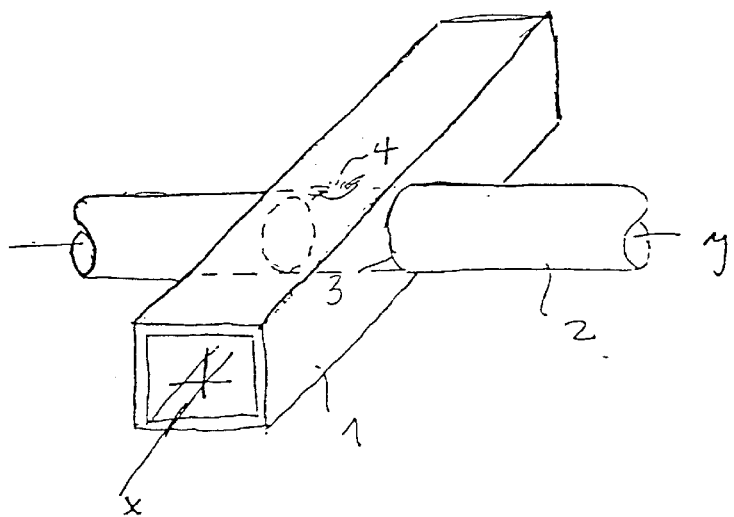
FIG. 2 shows an embodiment in which the cross-section of the first tubular element is rectangular.

FIG. 2 shows an embodiment in which the first element 1 comprises a tubular structure of substantially rectangular cross-section. Other tubular constructions are possible and are not limited to the embodiments of FIGS. 1 and 2. For example, the first and/or second elements could be tubular structures having a circular, oval, square, triangular or rectangular cross-section.

According to the present invention, the first and second elements 1, 2 are connected to one another at one or more positions 4 in the region of their intersection. In the embodiments of the FIGS. 1 and 2, the first and second tubes are connected at two positions at either side of the intersection indicated by the reference numeral 4. For example, when the elements 1, 2 are metal tubes as shown in FIGS. 1 and 2, the second tube 2 is inserted and properly positions with respect to the first tube. Welding is then performed at the positions 4 under sufficient pressure to urge the two sides of the first tube 1 into contact with the outer wall of the second tube 2 under formation of the weld. In this embodiment, the second tube 2 requires no further processing once purchased from the manufacturer. The first tube 1 need only be provided with the receiving hole at the proper orientation and spacing.

The inner dimension of the receiving opening 3 formed in the first element 1 is preferably sized with respect to the outer dimension d2 of the second element 2 such that there is no play between the receiving opening 3 and the second element 2. In this preferred embodiment, the second element 2 is then inserted through the opening 3 under the application of force to overcome friction between the outer surface of the second element 2 and the inner defining surfaces of the receiving opening 3. In this manner a non-positive frictional fit is established between the first and second elements 1, 2. This construction adds to the mechanical strength of the connection assembly, particularly against bending moments which may arise under load in the plane of the two elements.

Figure 3:
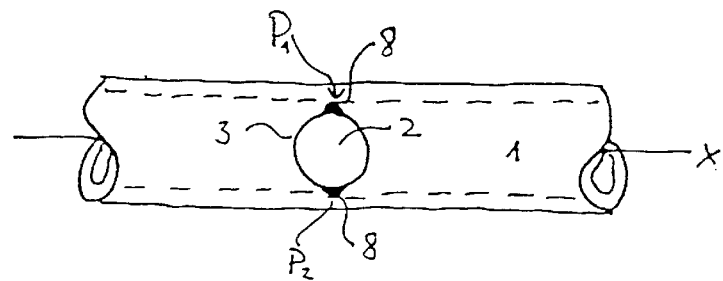
FIG. 3 shows another embodiment in which ridges are formed on the exterior of the second element which penetrates through the first element.

In another embodiment as shown in FIG. 3, the second element 2 is provided with two projecting ridges 8 on its outer surface. The receiving opening 3 is adapted to receive the second element 2 with the ridges and with or without play. Once inserted to penetrate through the first element 1, the two elements 1, 2 are connected to one another at the positions $P_1$ and $P_2$. Although not shown in FIG. 3, the first element 1 could also be provided with ridges on its interior surface. Such ridges could be disposed to engage with the projecting ridges (8) on the outer surface of the second element 2.

Figure 4:
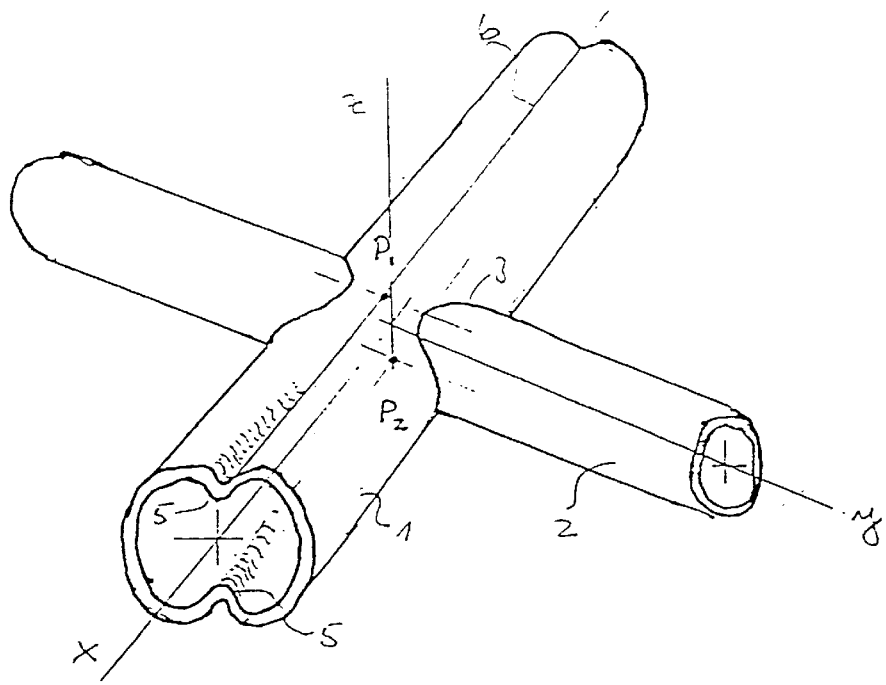
FIG. 4 shows an embodiment of the connection assembly in which ridges are formed on the interior of the first element.
Figure 5:
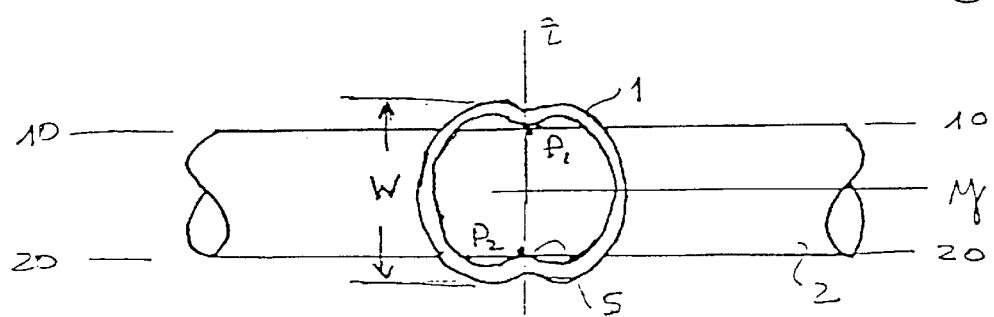
FIG. 5 shows a cross-section of the embodiment of FIG. 4 taken along the y-z plane.

In another preferred embodiment as shown in FIGS. 4 and 5, the first elongate element 1 is tubular and comprises two inner ridges 5 arranged to contact the outer surface of the second element 2 at two positions $P_1$, $P_2$. The tubular member 1 of larger diameter is preprocessed to form the two ridges 5 projecting into the interior of the tube. The ridges 5 can be formed when making the tube by externally applying pressure to form a longitudinal crease or indentation 6 as shown in FIG. 4. Alternatively, the indentation can be formed only in the regions of the intersection of the two elements. An internal ridge could also be formed in the interior during the production process of the tube, whereby the outer diameter of the tube would remain circular.

As shown in FIG. 5, the second tubular elements 2 in this embodiment define tangential planes 10, 20 which lie parallel to the plane defined by the centre axes x, y of the first and second tubes 1, 2 respectively. The inner ridges 5 of the first tube 1 are dimensioned so as to contact the outer surface of the second tube 2 at the two tangential planes 10, 20 when assembled. The connection of the two tubes is then performed at the two positions $P_1$ and $P_2$ where the crest of the inner ridges 5 contact the outer surface of the second tube 2. As mentioned above, the connection at these positions will normally be performed by resistance welding for metallic tubes or alternatively by fusion bonding or adhesion for plastic tubes.

As can also be seen in FIG. 5, the maximum width of the connection assembly corresponds to the distance W which is the dimension of the first tube 1 in the z direction. The overall width W is only slightly larger than the distance between the tangential planes 10, 20 of the smaller diameter of the second tube 2. This allows considerable savings in space for applications to grid constructions where space on either side of the grid is often of importance.

Figure 6:
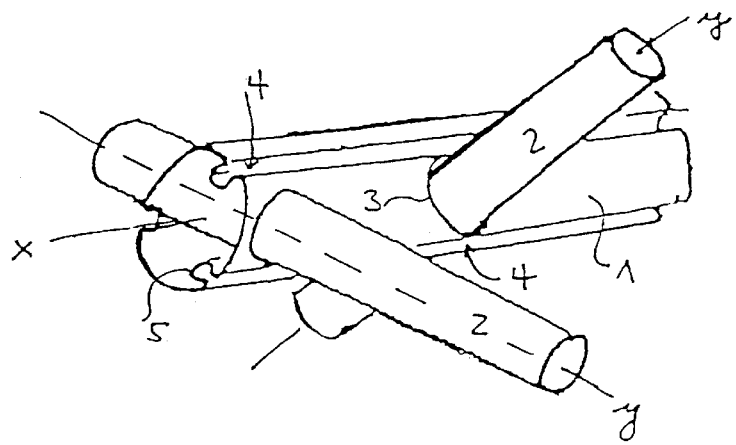
FIG. 6 shows an embodiment in which three inner ridges are formed within the first element such that the second element can be penetrated at various angles.

A further embodiment of the present invention is show in FIG. 6 wherein the first element is provided as a tubular member having three ridges 5 formed therein. In this embodiment, the second element 2 penetrates the receiving opening or hole 3 such that it contacts only one of the inner ridges 5. The contact position is indicated generally at reference numeral 4. Thus in this embodiment, the two elements 1, 2 are connected to one another at only one position. Depending on the angular spacing of the ridges about the centre axis x, the second elements 2 can be oriented at various angles about the axis x of the first tube 1. As can be seen from FIG. 6, the centre axis y of the second tube 2 does not intersect the centre axis x of the first tube 1. Generally, according to the present invention the respective axes x, y of the tubes need not intersect one another. This will depend on the particular application and on the relative diameters of the first and second tubular members 1, 2 as well as their desired orientation with respect to one another.

It will also be appreciated from FIG. 6 that the angular position of the ribs 5 could be positioned such that the outer surface of the tube 2 contacts two ridges on one of its sides and one ridge on the other side. The skilled person will recognize from FIG. 6 that many combinations of the ridge orientation and the second tube penetration position are possible.

Figure 7:
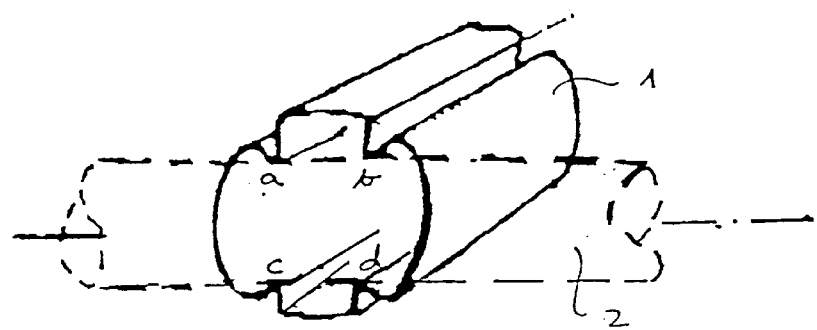
FIG. 7 shows a further embodiment in which the second element penetrates and contacts four ridges on the interior of the first element.

FIG. 7 shows another embodiment in which four ridges are provided to project into the interior of the first tubular element 2. In this embodiment, the receiving opening as well as the diameter of the second tubular element 2 is dimensioned such that the four positions a, b, c, d exist at which the elements can be connected to one another. As above, the embodiments of FIGS. 6 and 7 can comprise elements which are tubular in structure and which have circular, oval, square, triangular or rectangular cross-sections. Alternatively, the second elements could be solid rods having the various cross-sections.

Figure 8:
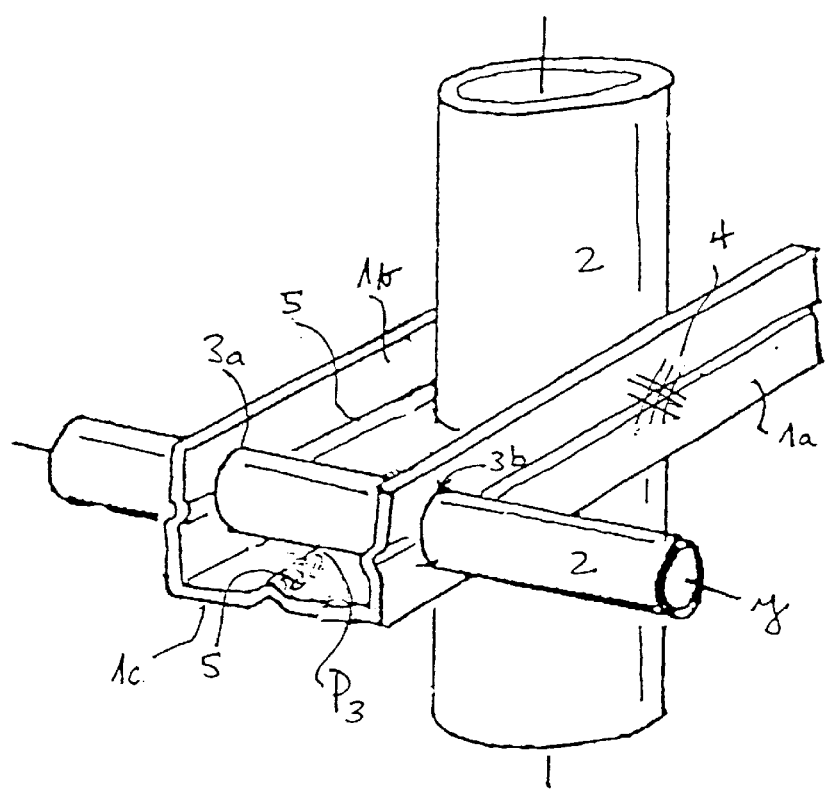
FIG. 8 shows an embodiment in which the first element comprises a U-profile with inner ridges.

A still further embodiment of the present invention is shown in FIG. 8. In this case, the first elongate element is provided as an open profile, particularly a U-shaped profile. However, any shape of the open profile is possible as long as walls 1a, 1b, 1c are present through which the receiving opening 3 can be formed. In the present embodiment of FIG. 8, the side walls 1a, 1b of the U-shaped profile are substantially parallel to one another. This would make it somewhat easier to form the receiving holes 3a, 3b, for example by means of stamping. As shown in FIG. 8, the second element 2 can be penetrated through the two parts 3a, 3b of the legs 1a, 1b of the U-shaped profile. Alternatively, the base 1c of the U-shaped profile can be provided with a single opening (not shown) through which the second tubular member 2 passes. In this case, the element 2 is connected to two inner ridges 5, one on either of the legs 1a, 1b. The connection position is shown by the reference numeral 4 on the exterior of leg 1a.

When the second tubular member 2 passes the profile through the legs 1a, 1b, the outer surface of the second element 2 contacts a ridge 5 formed in the base 1c of the U-shaped profile. The contact position $P_3$ is then the single position at which the two elements are connected with one another.

Figure 9:
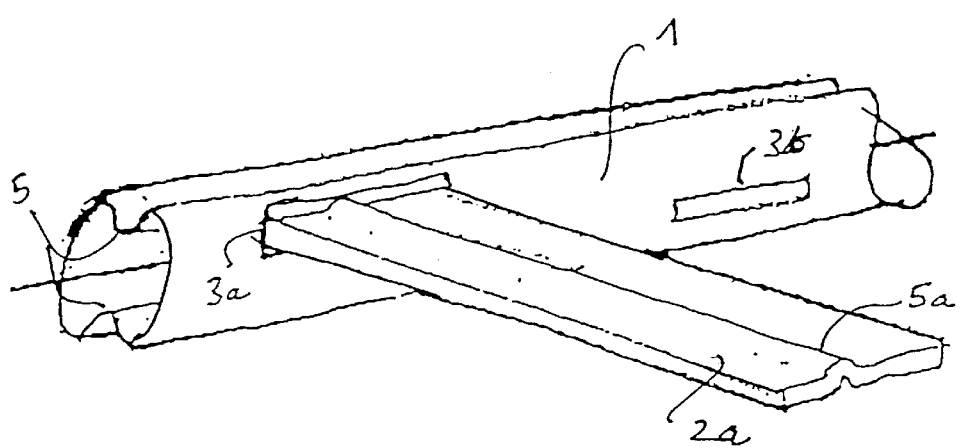
FIG. 9 shows an embodiment in which the second element comprises a plate inserted in a slot in the first element.

Another embodiment of the invention is shown in FIG. 9, where the penetrating element 2a is formed as a plate. The plate 2a passes through a slot 3a formed in the first tubular member 1. When inserted, a ridge 5a formed on the plate 2a contacts the crest of an inner ridge 5 formed in the element 1. As shown in FIG. 9, one plate element could be inserted to contact the upper ridge 5 of the tubular element 1. It is apparent that another plate element 2a could be inserted into a slot indicated as 3b in FIG. 9 with the ridge 5a being oriented downwardly. In this case, the ridge 5a of the plate will contact the lower ridge 5 within the tube 1. Other variations are possible. For example, the plate 2a could be provided with two or more ridges allowing two or more connection positions with the inner ridge 5 of the tube 1.

Although it is preferred to weld the two elements at their connected positions when made of metal or to bond the elements when made of plastic, it would also be possible to form the connections at the one or more positions by means of a form fit. For example, in the FIGS. 4 to 9, at least one inner ridge of the first tubular member engages with the outer surface of the second element 2. It would be possible to form a recess or indentation in the outer surface of the second element 2 for receiving the crest of the ridge. The engagement of the ridge in the recess on the outer surface of the second element 2 establishes a form fit connection, which would prevent axial movement of the second element 2. Alternatively, the first tubular element could be indented inwardly to force a matching indentation of the outer surface of the inner second element. The matching deformation of the first and second elements would also provide a form fit. For example as shown in FIG. 2, an indentation could be formed in the outer tube 1 at the location 4. The indentation 4 would be deep enough to form a matching deformation in the second tube 2, whereby an interconnecting fit would be established.

Figure 10:
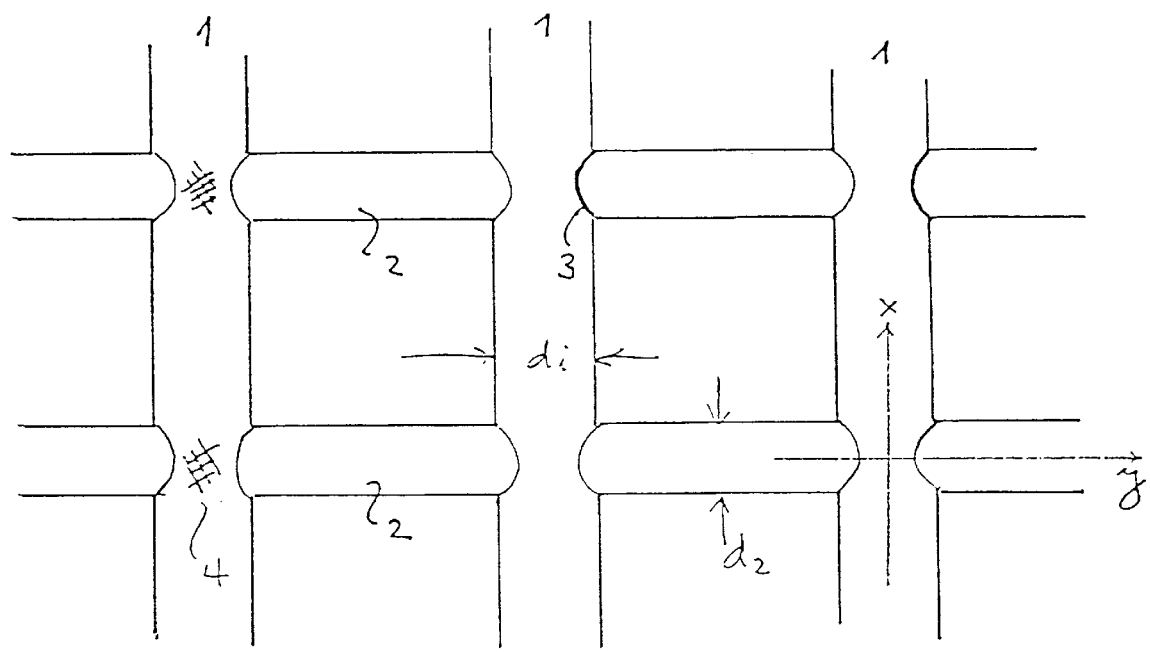
FIG. 10 shows a grid construction comprising intersections formed of the connection assembly of the present invention.

The connection assembly of the present invention is particularly suitable for the formation of a grid. FIG. 10 illustrates an embodiment of such a grid comprising first and second tubes 1, 2 arranged parallel to one another in spaced relationship. At their intersections, the first and second tubes are provided with a connection assembly as described above. The grid construction formed in this manner provides particularly high mechanical strength while being light in weight. Moreover, only the first tube 1 need be further processed, for example by the formation of the receiving hole or the provision of a ridge. The other cross tube 2 can be used as it is supplied from the manufacturer. The formation of the grid is therefore easy and inexpensive and readily adaptable to series production.

What is claimed is:

1. A connection assembly comprising:
    a first elongate element having a receiving opening formed therein and wherein the first element is tubular; and
    a second elongate tubular element, the first and second elongate elements being connected to one another at an intersection, wherein the second element is passed through the receiving opening of the first element, and wherein the first element is connected to the second element at at least two positions in a region of the intersection and wherein the first element comprises at least two inwardly extending ridges, the ridges arranged to lie adjacent an outer surface of the second element to form the at least two positions of connection.

2. The connection assembly of claim 1, wherein the first and the second elements are circular in cross-section, and wherein the two ridges are formed opposite one another with respect to a center axis of the first element, the two ridges contacting the outer surface of the second tubular element to form the at least two positions at which the elements are connected.

3. The connection assembly of claim 1, wherein the first element comprises three inner ridges, the receiving opening being provided such that the outer surface of the second element contacts at least one of the inwardly extending ridges at which position the elements are connected.

4. The connection assembly of claim 1, wherein the first element comprises four inner ridges, the four ridges arranged to contact the outer surface of the second element at four positions at which the elements are connected.

5. The connection assembly of claim 1, wherein the first and second elongate elements are tubular, the elements having a cross-sectional shape selected from the group consisting of circular, oval, square, triangular, and rectangular.

6. A connection assembly comprising:
    a first elongate tubular element having a receiving opening formed therein; and
    a second elongate tubular element, the first and second elongate elements being connected to one another at an intersection, wherein the second element is passed through the receiving opening of the first element, and wherein the first element is connected to the second element at at least two radially opposed positions in a regions of their intersection and wherein the profile has at least two inwardly extending ridges arranged axially with respect to a major axis of the first element to contact an outer surface of the second element to form the at least two positions of connection.

* * * * *